May 13, 1947.   G. JACOBS   2,420,541
PUMP JACK
Filed Feb. 1, 1944   2 Sheets-Sheet 1

Inventor
Grant Jacobs
By Clarence A. O'Brien
and Harvey B. Jacobson
Attorneys

May 13, 1947.  G. JACOBS  2,420,541
PUMP JACK
Filed Feb. 1, 1944   2 Sheets-Sheet 2

Inventor
Grant Jacobs

Patented May 13, 1947

2,420,541

UNITED STATES PATENT OFFICE 2,420,541

PUMP JACK

Grant Jacobs, Des Moines, Iowa

Application February 1, 1944, Serial No. 520,677

5 Claims. (Cl. 74—219)

This invention relates to new and useful improvements in pump jacks, the principal object of the present invention being to provide a pump jack which eliminates the use of gears and employs sprocket wheels and chains instead.

Another important object of the invention is to provide a pump jack wherein the gearing is in the form of sprocket wheels and chains to the end that the parts are more accessible and capable of being more inexpensively repaired than gear trains.

Other objects and advantages of the invention will become apparent to the reader of the following description.

Figure 1:
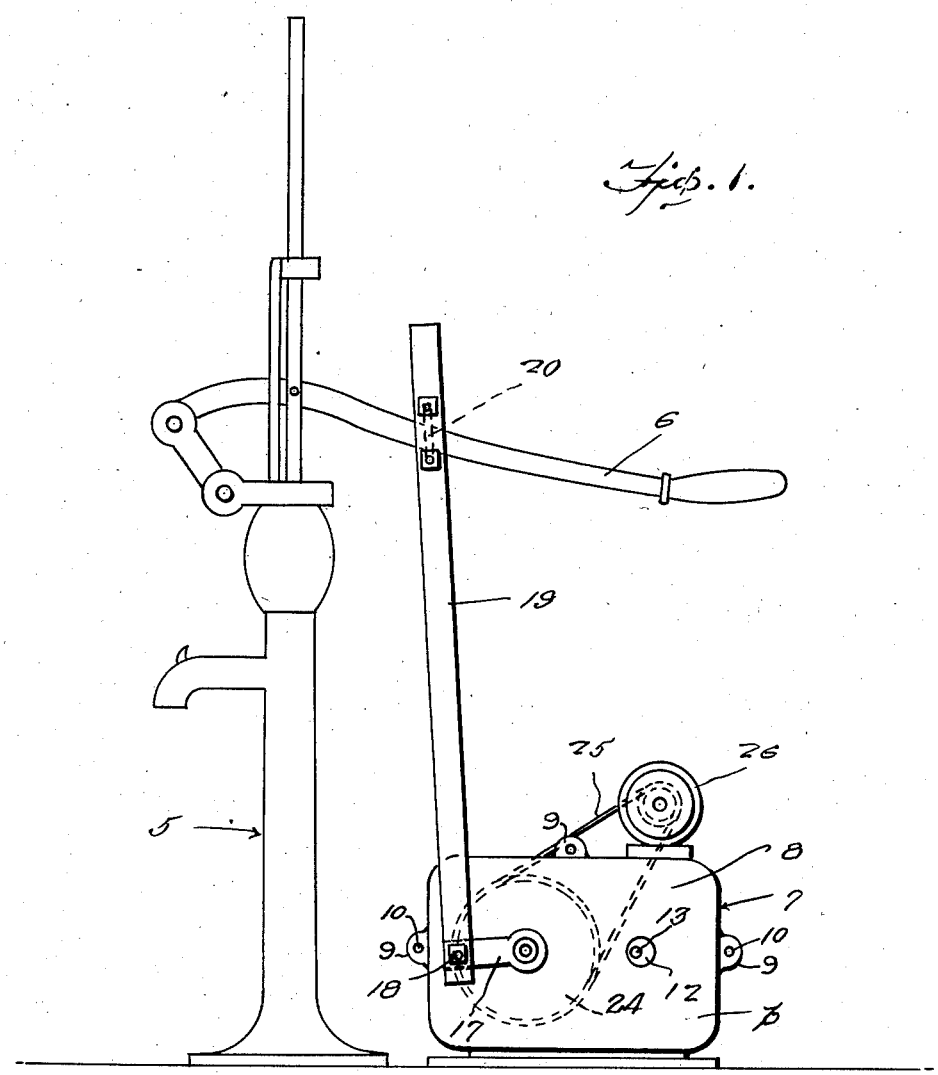
Figure 1 represents a side elevational view of the pump jack shown connected with a pump.
Figure 4:
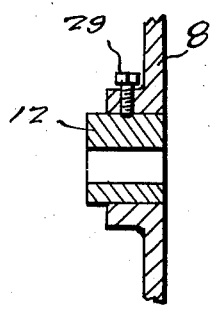
Figure 4 is a fragmentary detailed sectional view showing one of the eccentric bearings.
Figure 2:
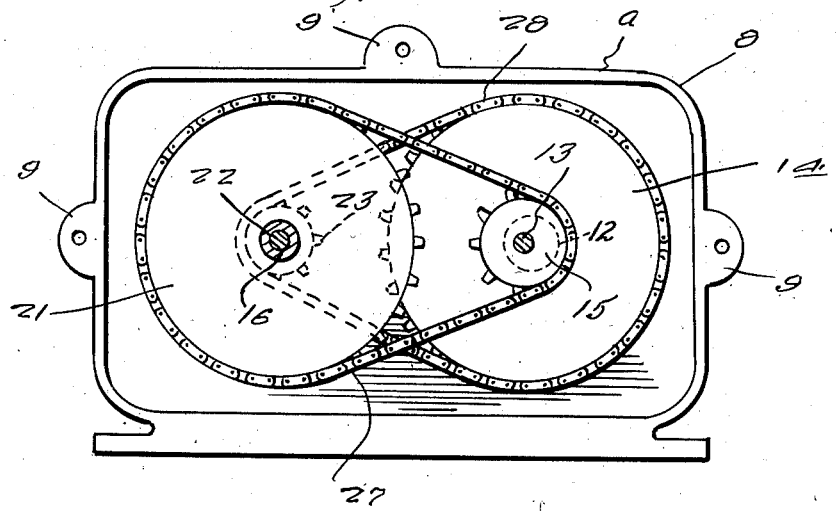
Figure 2 is a sectional view vertically through the pump jack.
Figure 3:
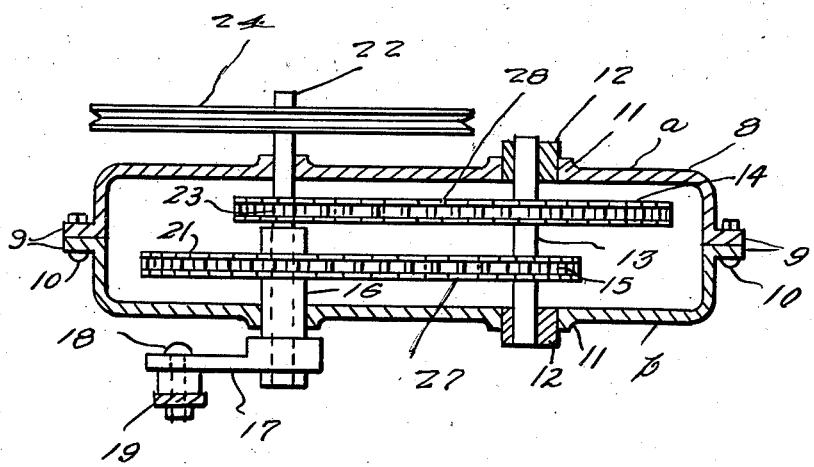
Figure 3 is a horizontal sectional view through the pump jack.

Referring to the drawings wherein like numerals designate like parts, it can be seen that numeral 5 generally refers to a pump structure including the usual pump handle 6.

Numeral 7 generally refers to the improved pump jack which consists of a case 8 made up of a pair of sections $a$, $b$ the same being provided with ears 9 bolted together as at 10.

The sections $a$, $b$ are formed with openings 11 and each of which is placed in eccentric bearings 12 and these bearings serve to receive the corresponding ends of a shaft 13 on which is a large sprocket wheel 14 and a small sprocket wheel 15.

Disposed through an opening in the section $b$ is a tubular shaft 16 having a crank arm 17. To the crank arm 17 is attached pivotally as at 18 a connecting rod 19 which is clamped as at 20 to the pump handle 6.

At the inside of the case 8, the tubular shaft 16 is equipped with a large sprocket wheel 21.

A shaft 22 extends into the case section $a$ and is journaled in the tubular shaft 16. The shaft 22 carries a small sprocket wheel 23 at the inside of the case, while at its outer end a large pulley 24 is provided and over this can be disposed a belt 25 driven by an electric motor 26 suitably secured upon the case 8. A sprocket chain 27 is trained over the sprocket wheels 15 and 21, while a sprocket chain 28 is trained over the sprocket wheels 23 and 14.

Set screws 29 are provided for the eccentric bearings 12, so that the same can be adjusted and firmly held in position to tighten the sprocket chains 27, 28.

Obviously, when the motor 26 operates, the speed delivered by the motor will be reduced to the proper operating rate in actuating the pump arm 6.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A speed reducing unit comprising a case, a rotary shaft disposed through the case, a tubular shaft projecting into the case and rotatably mounted, a third shaft having its inner end rotatably mounted through the tubular shaft, sprocket wheels carried by the shafts within the case, sprocket chains trained over the sprocket wheels, a motor in driving relation to the third shaft, the tubular shaft being provided with an arm, and means for connecting the arm to a member to be operated.

2. A speed-reducing unit comprising a case, a rotary shaft disposed through the case, a tubular shaft projecting into the case in spaced parallel relation to said shaft, a third shaft having its inner end rotatably mounted in the tubular shaft, sprocket wheels carried by the shafts within the case, sprocket chains trained over the sprocket wheels, a motor in driving relation to the third shaft, and means for connecting the tubular shaft with a member to be operated.

3. A speed-reducing unit comprising a case, a rotary shaft disposed through the case, a tubular rotary shaft projecting into the case, a third shaft having its inner end rotatably mounted through the tubular shaft, sprocket wheels carried by the shafts within the case, sprocket chains trained over the sprocket wheels, a motor in driving relation to the third shaft, the first-mentioned shaft being shiftable to adjusted position for tightening the chains.

4. A speed-reducing unit comprising a case, a shaft rotatably mounted through the case, a tubular shaft projecting into the case and rotatably mounted in spaced parallel relation to the first shaft, a third shaft having its inner end rotatably mounted through the tubular shaft, sprocket wheels carried by the shafts within the case, sprocket chains trained over the sprocket wheels, a motor carried by said case in driving relation to the third shaft, the tubular shaft being provided with an arm, and means for connecting the arm with a member to be driven.

5. A speed-reducing unit comprising a case, a rotary shaft disposed through the case, a tubular shaft projecting into the case and rotatably mounted, a third shaft having its inner end rotatably mounted through the tubular shaft, sprocket wheels carried by the shaft within the case, sprocket chains trained over the sprocket wheels, a motor mounted upon said case, pulleys carried by the third shaft and the shaft of the motor, a belt trained about the pulleys, the tubular shaft being provided with an arm, and means for connecting the arm with a member to be driven.

GRANT JACOBS.

REFERENCES CITED

The following references are of record in the file of this patent:

UNITED STATES PATENTS

| Number | Name | Date |
| --- | --- | --- |
| 1,854,018 | Carlberg | Apr. 12, 1932 |
| 1,592,021 | De Lew et al. | July 13, 1926 |
| 2,311,993 | Olsen | Feb. 23, 1943 |
| 1,865,290 | Vaughn | June 28, 1932 |
| 2,087,785 | Sjolseth | July 20, 1937 |
| 2,284,932 | Thiemann | June 2, 1942 |